April 1, 1958   R. J. HERBOLD   2,828,930
ELECTRONIC APPARATUS FOR STABILIZING THE ATTITUDE
OF MOVING CRAFT AND INSTRUMENTS
CARRIED THEREBY Filed June 21, 1952   3 Sheets-Sheet 1

INVENTOR.
ROBERT J. HERBOLD
BY
*Clayton L. Jenkes*
ATTORNEY.

April 1, 1958
R. J. HERBOLD
2,828,930
ELECTRONIC APPARATUS FOR STABILIZING THE ATTITUDE
OF MOVING CRAFT AND INSTRUMENTS
CARRIED THEREBY
Filed June 21, 1952
3 Sheets-Sheet 2
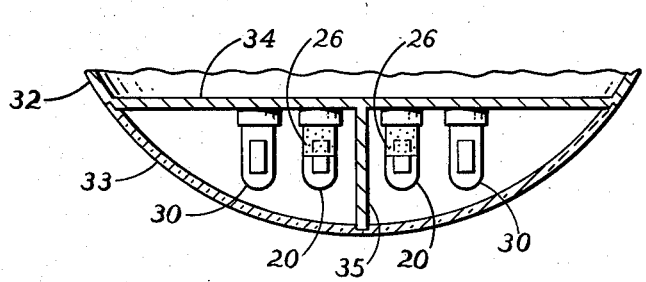
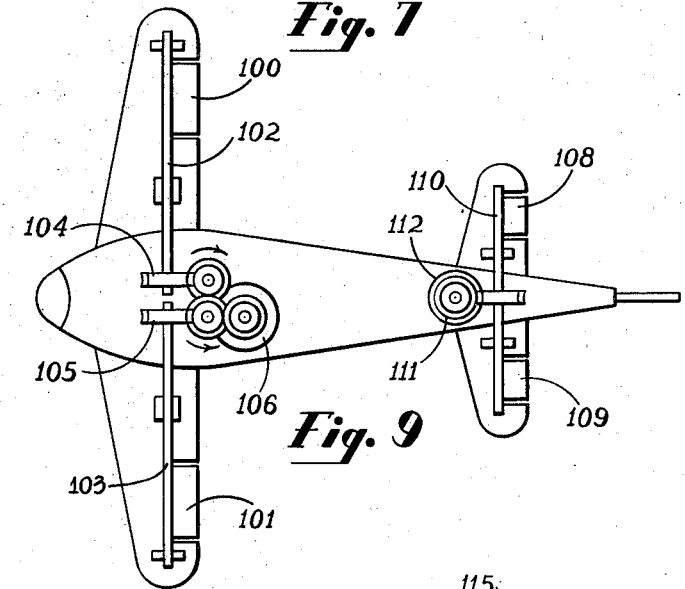
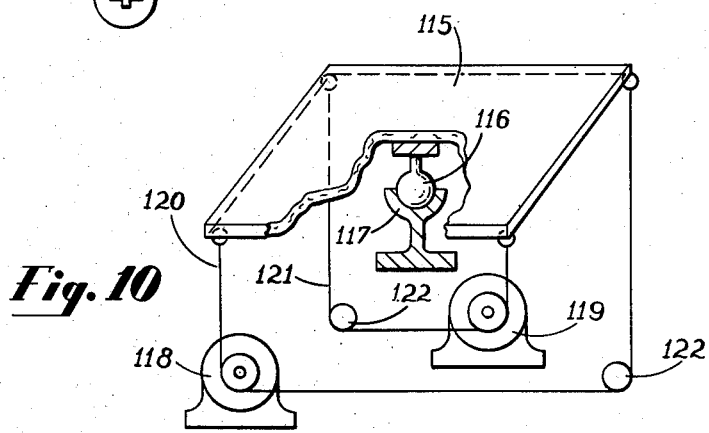
INVENTOR.
ROBERT J. HERBOLD
BY
Clayton L. Jenks
ATTORNEY.

United States Patent Office 2,828,930
Patented Apr. 1, 1958

2,828,930

ELECTRONIC APPARATUS FOR STABILIZING THE ATTITUDE OF MOVING CRAFT AND INSTRUMENTS CARRIED THEREBY

Robert J. Herbold, Denver, Colo., assignor to Lafayette M. Hughes, Denver, Colo.

Application June 21, 1952, Serial No. 294,941

5 Claims. (Cl. 244—77)

This invention relates to electronic apparatus for stabilizing the attitude of moving craft and instruments carried thereby.

Various problems are involved in stabilizing a craft during its normal travel or in stabilizing a support for apparatus mounted on a rolling or pitching boat or aircraft. The stabilization of a moving body requires an invariable reference plane or direction of energy or other constant uni-directional medium with reference to which the position of the craft may be compared. The direction of terrestrial electromagnetic lines of force which affect a compass varies for different locations on the earth and does not provide a satisfactory reference for some conditions. Gravity is uni-directional, but at the high speeds now feasible for craft flight, the action of gravity alone is insufficient for a reference. Also, gyroscopes and related instruments require complex structural features to compensate for variable conditions, but these are affected by the extremely high speeds that are now feasible. It is desirable to have a horizontal or other plane which may serve as a reference for various instruments.

I propose to employ an electronic device for determining or controlling an instrument or craft attitude, but this depends upon the provision of an invariable plane for the reference. For that reference, I use the earth horizon or the horizontal plane that is perpendicular to an earth radius at the point of location of the craft.

The primary object of my invention is accordingly to provide electronic apparatus which employs the horizon as a reference plane and in accordance therewith governs or controls the stability or attitude of the craft or an instrument carried thereby.

Another object is to provide an electronically controlled apparatus which will automatically maintain an aircraft in a substantially horizontal flight plane.

A further object is to provide an electronically controlled apparatus which will maintain an instrument or a support therefor in a substantially stationary position with reference to the horizon plane in spite of any rolling or pitching of a craft carrying the same.

Another object is to provide a simple type of electronic scanning apparatus which employs the horizon as a reference plane for the control or operation of other apparatus. Further objects will be apparent in the following disclosure.

The operation of my electronic scanning device, which views the earth horizon and electrically responds or indicates when a horizontal plane is maintained with reference thereto, is based on the fact that when an aircraft is at a sufficiently high altitude, the earth horizon provides a substantially horizontal reference plane perpendicular to the earth axis at that point, irrespective of mountains and other surface irregularities. Similarly, the horizon of the ocean appears to be substantially in a horizontal plane when viewed from a high point on a boat. Light from the sky may be employed to activate the photo sensitive element of a suitable cell which is in a condition of saturation for a minimum light intensity, and that cell will respond according to whether its activation is caused by the greater light from the sky or from the lesser earth light. Hence, if the cell is tilted toward the sky, it gives a larger output than when it scans the earth. The electronic system is such that it is balanced for the variable ambient light and therefore responds only to a variation in the ratio of the sky and earth lights as is caused by a tilting of the craft. This differential activation which distinguishes between earth and sky light is provided by so shadowing the photo sensitive element that any tilting of the cell varies its area of activation and therefore the cell output. My device is so constructed that the electronic activation is proportional only to the photo sensitive area illuminated.

Referring to the drawings which diagrammatically illustrate embodiments of this invention:

Fig. 7 is a fragmentary sectional view of a bottom portion of an aircraft showing two opposed sets of scanning tubes mounted therein;

Fig. 9 is a diagrammatic plan view of a craft illustrating the connections of the governing motors and the craft elevators and ailerons; and Fig. 10 is a fragmentary diagrammatic showing of an instrument table balanced by two controlling motors.

Figure 1:
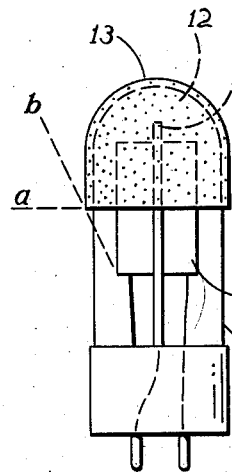
Fig. 1 is a front view of a shielded photo tube held vertically and with the upper half of the cathode in the shadow of the shield.
Figure 2:
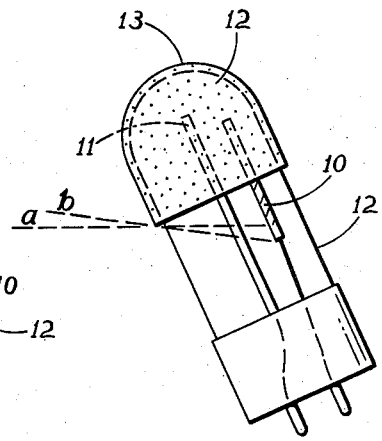
Fig. 2 is a side view of the tube tilted towards the left, with all of the cathode shadowed.
Figure 3:
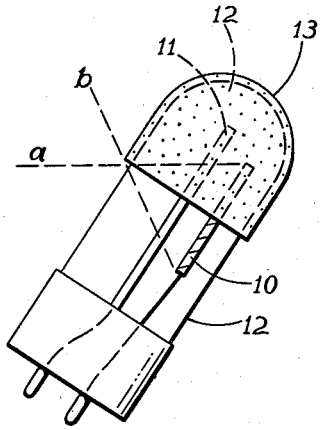
Fig. 3 is a similar view showing the entire surface of the cathode lighted when the tube is tilted to the right.

A suitable photocell for this purpose is described in my Patent #2,489,222 of November 22, 1949. It comprises a cathode having a light sensitive surface which has its area of activation varied in accordance with the directive angularity of light passing the edge of a shield extending to a medial point on the cathode and arranged to shadow a variable portion of the cathode surface as the light angle changes. This cell may be so arranged that it will scan the horizon and differentiate electronically between the sky and earth lights. The photo sensitive electron emissive tube of Figs. 1, 2 and 3 may comprise a cathode 10, whether a plate or a wire, having a coating of a suitable light sensitive material and an anode 11 mounted within a cylindrical, transparent glass tube 12. The upper half of the glass tube is enveloped by a shield 13 made of a suitable opaque material or a semi-translucent shield which will restrict the passage of certain wave lengths of light, and particularly the infra red. As shown in Fig. 1, the shield is so located that when the tube is vertical, a horizontal ray of light represented by the dotted line $a$ just passing the lower circular horizontal edge of the shield bisects the cathode 10. This line $a$ may therefore represent the horizon, and any light from the darker earth that strikes the upper part of the cathode obviously has a lesser actinic value than has the light passing to the cathode through the triangle between the horizon line $a$ and the line $b$ which just clears the edge of the shield and strikes the bottom edge of the cathode. That is, the bottom half of the cathode may be activated by rays of light coming from above the horizon but bounded by the oblique line b. It is to be understood that suitable shields will eliminate other extraneous light rays. If the tube is tipped towards the left, as shown in Fig. 2, the angle between the lines a and b representing the angle at which light may strike the cathode becomes smaller so that when the lines a and b coincide the cathode is not illuminated or activated. If the tube is tipped towards the right, as shown in Fig. 3, then that angle becomes larger and in an ultimate position of tilt the cathode is fully illuminated. This applies to the various photosensitive cells, whether they are of the voltaic, the resistance, or photo conductive, or the electron emissive types, and each type may be used in my system with suitable wiring modifications. A photo conductive cell may comprise a resistance wire of selenium or other metal which has its conductivity varied by light. A photo voltaic cell may comprise copper oxide in a suitable electricity generating system which has its activity varied by light. I prefer to use one of the various electron emissive tubes, as herein described.

I propose to mount a photosensitive element on the craft and so shield it that it normally receives light only from a limited vertical angle above and below the horizon so that its activation responds to a variation in the ratio of the sky and earth lights as the craft tilts. I prefer to employ a plurality of photocells on the craft where each may scan a definite angular portion of the horizon and thus be activated in accordance with the tilt of the photocell and the corresponding angularity of the light which passes the shield onto the cathode. In order that variations in light conditions, such as are found when the craft is within a heavy cloud, may not affect the control apparatus, I employ a pair of balanced tubes for each sector of the horizon. The balanced tubes may be similar in their characteristics and arranged to receive the same directional light, except that the shield is omitted from one so that it is affected by the ambient light at all times. These two tubes are so arranged in a balanced bridge circuit that any variation in light intensity will affect each of the tubes equally and thus counteract such variation.

Figure 4:
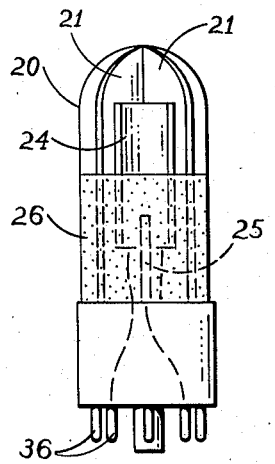
Fig. 4 is a vertical view of a compound photo tube having a separate cathode and anode pair in each of four vertical quadrants.
Figure 5:
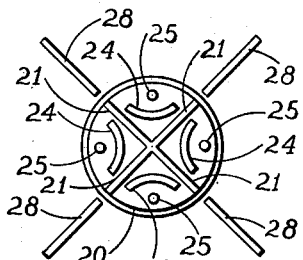
Fig. 5 is a top plan view of the compound tube and showing inner and outer screens dividing the quadrants.
Figure 6:
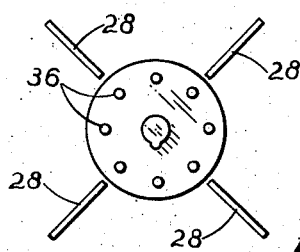
Fig. 6 is a plan view of the bottom of the tube.

The four shielded tubes may be consolidated in a compound construction, as shown in Figs. 4, 5 and 6. This comprises a glass or other translucent, substantially cylindrical tube 20 having four opaque partitions 21 arranged diametrically and vertically therein and shaped to divide the inner cylindrical space into four vertical quadrants. These partitions may be made of metal, plastic or other material that will not transmit the activating rays of light from one compartment to another. Mounted at the rear in each wide angled quadrant is a cathode 24 having its active surface facing outwardly, and in front is an anode 25. These are suitably positioned and shaped to satisfy the requirements of the invention. The cathode may be a flat plate activated on its front exposed face, as shown in Fig. 1, and the anode may be a centrally located metal rod or a rectangular metal frame. The cathode may be made of a set of coated wires mounted on a rectangular frame, as described in my copending U. S. Patent No. 2,656,477, dated October 20, 1953. In that construction, the cathode comprises a rectangular nickel or other metal wire frame carrying a set of parallel wires of nickel coated with silver and sensitized by means of a coating of caesium metal on a base of oxidized caesium laid on the silver, which is so treated as to provide a surface that is sensitive to or activated by infra red light in particular.

The outside of the glass wall 20 is provided with a shield 26, like the shield 13, which is adapted to cut off the infra red rays of light that would activate the cathode. The shield is arranged to protect or shield half of the cathode from a horizontal ray. The shield 26 may be formed by coating the outer surface of the glass with a suitable gelatin, such as corresponds with a Wratten gelatin filter #64, 65 or 67, which transmits light other than red and infra red. Such a shield permits activation of all of the cathode surface by ambient light but shadows it only for the red and infra red rays, or other rays selected for the purpose. Since the earth is a source of infra red rays it is desirable to shield the cathode from such wave lengths. This screen may also be made of a film of cellulose acetate or nitrate applied on the outside of the glass to the required thickness to shield the cathode. The translucence of this film may be controlled by adding opaque powders or dyes, such as by incorporating a small amount of dispersed graphite or a dye in a nitrocellulose solution before it is applied to the glass surface. This shield may also be made of an entirely opaque material to shut off all light rays from the cathode areas shadowed thereby. Infra red rays travel in straight lines and there is little or no ambient infra red light in the air which would affect the operation of the device. Instead of coating the glass, a cap or band of suitable material may be shaped and fitted over the outside of the tube. Various other expedients may be employed. In order to protect each cathode from light coming from another quadrant, I may also provide an outside shield comprising four vertical partitions 28 arranged at right angles to serve as continuations of the inner partitions 21, and these may be suitably mounted for the purpose.

Mounted within the same quadrant defined by each adjacent pair of outer partitions 28 is a second balancing tube 30 which has the same electronic characteristics as the one provided with the shield 26. This balancing tube may be a compound tube like that shown in Figs. 4, 5 and 6 and have identical characteristics except for the absence of the shield 26. In that case, only two of the compound tubes are required in the system. If desired, separate photocells of the type shown in Figs. 1 to 3 may be employed for either the shielded cell or the non-shielded cell.

These tubes may be suitably mounted on the craft where they may scan the horizon and some of the sky light. For example, as shown in Fig. 7, the fuselage 32 of the craft may carry a suitable downwardly projecting bay 33 formed of transparent material capable of passing all of the required actinic rays. The tubes 29 and 30, shown as separate pairs, may be suitably mounted where they project downwardly from an opaque wall 34, and in that case the shield 26 will be at the bottom of the tube as shown in Fig. 4 and so will extend from the top base plug downwardly half way across the cathode in the position illustrated in Fig. 7. Four vertical partitions 35 separate the quadrants, if four separate pairs of tubes are used. These partitions 35 correspond with the partitions 28 of Fig. 5. If compound tubes (Fig. 4) are used, only two are needed, one mounted vertically above the other. The base of the multiple cathode tube of Fig. 4 may be provided with a suitable number of prongs 36 that are connected properly with the respective cathodes and anodes in each quadrant, and these prongs will be connected into the electrical circuits as needed. Various constructional details may be employed in the structure and mounting of these tubes, as well as the shields and the light confining walls.

Any unbalanced condition in the electrical system as caused the craft tilting may be employed to control the position of a movable member relative to the horizon. In the construction illustrated, the unbalanced system including the cathodes of each two corresponding cell quadrants facing in a given direction can be employed to actuate a control mechanism governing the position of the cathode relative to a vertical line. For example, an electronic circuit, which is normally balanced when the two opposed sets of cells are vertical or at a desired angle, may be employed to control a servo-motor which in turn governs or actuates mechanism that controls the position of the photo cells. The four photo-cell quadrants of Fig. 5 are connected electrically in two separate circuits, having oppositely facing cells in each circuit. That is, cells facing north and south, for example, will be in one circuit, and the east, west cells in the other. These two circuits are electrically alike. As one system which operates to this end, a reversible motor which controls the ailerons or elevators of an aircraft may have its field or armature current varied in accordance with the directive angle illumination and activation of the cathodes, as indicated by the response of the unbalanced circuit, to cause the motor to so adjust the positions of the ailerons or elevators as to bring the craft, or a platform carrying various instruments, back to a normal horizontal position. One set of balanced photo cells may scan the horizon in opposite directions lateral of the craft and thus control the lateral variation from a horizontal, while another set is arranged to scan the horizon to the front and rear or at right angles to the first pair to control the pitch or forward tilt of the craft.

Figure 8:
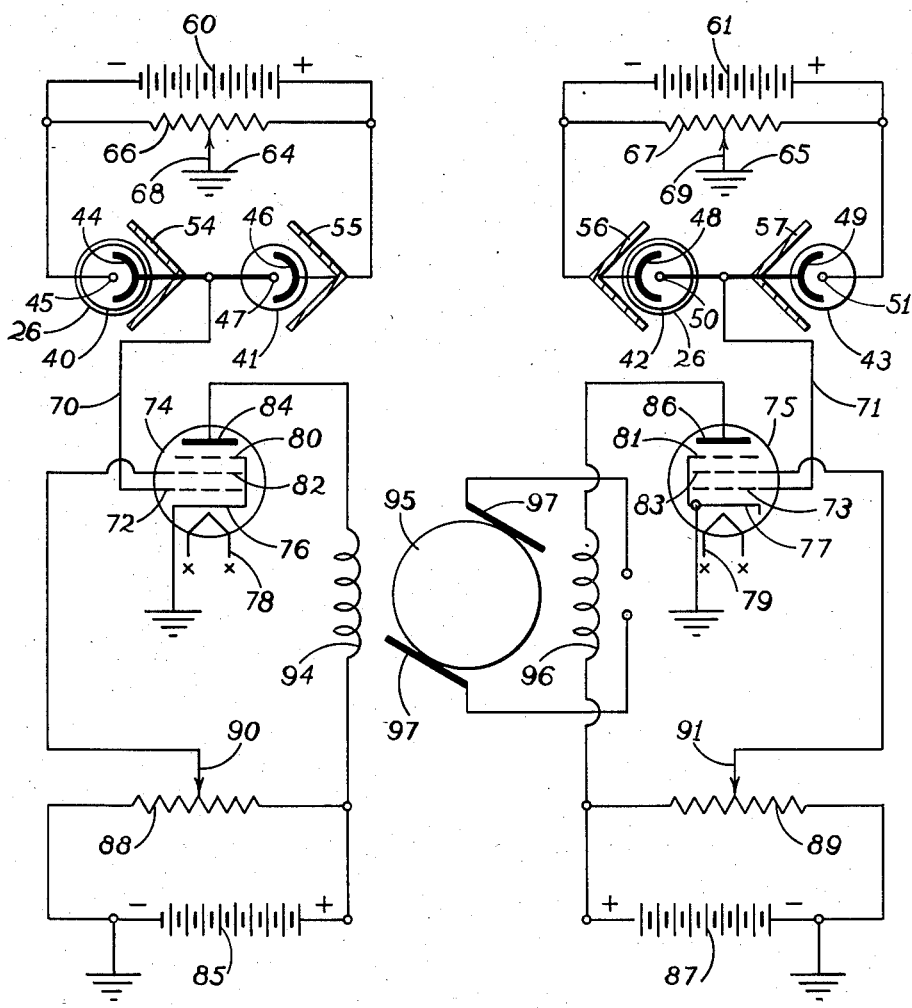
Fig. 8 is a wiring diagram for two opposed sets of tubes which control one motor.

As above stated, I utilize a pair of balanced cells for each scanning unit to eliminate variations in activation of each primary scanning cell due to ambient light, or to neutralize other effects resulting from a variation in intensity of light or angularity of the light direction. A suitable electrical circuit for each of the two motors which controls the elevators and ailerons is shown in Fig. 8. In this construction, a pair of photo tubes 40 and 41, as above described, are arranged to scan the left-hand side of the craft, for example, while another like pair of tubes 42 and 43 scan the right-hand side. Tubes 40 and 42 are shielded tubes and tubes 41 and 43 are not shielded, and they may be compound tubes constructed as above described, although here considered as separate tubes. The tube 40 at the left comprises a cathode 44 and an anode 45, and the tube 41 has a cathode 46 and an anode 47. The set at the right has corresponding cathodes 48 and 49 and anodes 50 and 51, as shown. The left hand set of tubes is shielded by shields 54 and 55 facing to the left, and the right hand set is shielded by shields 56 and 57 so as to be affected only by light from the right. These shields in the compound cell system of Fig. 5 are formed by the partitions 21 and 28 which limit the light direction to an angle of 90°. The cathode 44 of one cell is connected to the anode 47 of the balancing cell. Similarly, anode 50 connects with cathode 49 in the right hand set. Each set of balanced tubes is in series with a battery 60 or 61 or other source of power, and the two cells are so arranged that each forms a load for the other. The right and left hand circuits are alike and will be described together. The grounded contact 64 or 65 is connected to a variable resistance 66 or 67 of a potentiometer which is connected across the battery terminals between the anode and the cathode of the balanced cells, as illustrated. This bridge circuit is balanced by varying the position of the grounded contact arm 68 or 69 when the two photo tubes are exposed to the same light conditions or when the craft is flying in a horizontal plane and the opposed sets of tubes each receive the same amount of light activation. A common terminal 70 or 71 between the anode and cathode of each set leads to the grid 72 or 73 of an amplifier tube 74 or 75, such as a triode or the pentode illustrated. The cathode 76 or 77 grounded to the craft framework carrying this amplifier tube is heated by a supplemental circuit 78 or 79 according to standard practice, and it is further connected to a screen grid 80 or 81 arranged between the cathode and the anode. A suppressor grid 82 or 83 serves its usual purpose. The anode 84 of the left hand set is connected to the positive terminal of a battery 85 which has its negative terminal grounded. The anode 86 of the other set connects similarly with a battery 87. A resistance 88 or 89 across the terminals of the battery has a multiple contact 90 or 91 arranged to vary the potential of the grid, as illustrated. The two pairs of photo tubes which scan to the left and the right of the craft, as well as the other two pairs that scan ahead and to the rear, have identical circuits.

The battery and amplifier circuit controlled by the left hand tubes 40 and 41 includes a field winding 94 so arranged relative to the armature of a D. C. motor 95 or a rotary solenoid of suitable construction as to cause the motor armature to rotate in a required direction. A separate field winding 96 in the same motor 95 is controlled by the scanning tubes 42 and 43 at the right, and this field winding is arranged to reverse the polarity and cause the armature to turn in the opposite direction from that controlled by the other field 94. If the currents in the two fields 94 and 96 are equal and in opposite directions, then the sum of the fields is zero and the motor does not turn. If, however, the craft tilts to one side, the tube system that scans to the left is thrown out of balance as to create an increased field at 94, and coincident therewith is a reduced field at 96. Thus the motor is driven in a given direction by the increased current flow in field 94, and that movement of the motor armature is employed to reduce the out-of-balance condition and equalize the fields and bring the motor back to a condition of inoperativeness.

The same conditions hold for a second electronic system made up of two further pairs of tubes which scan in the other two quadrants. One system will serve to control the elevators of the craft and compensate for the forward tilt or pitch while the other controls the ailerons and the lateral craft tilt, so that the two sets will maintain or return the craft into a horizontal position. It will be evident that the motor 95 of each system may be a servo-motor or a member of a synchronous set which controls a more powerful motor capable of moving the elevators and ailerons as needed. Various electrical constructions may be employed for this purpose. The motor 95 may be considered as a rotary solenoid and suitable expedients may be adopted to prevent the motor from turning beyond a very slight distance, so that the tilt of the aileron or elevator is varied only through a very slight angle. Suitable controls for this purpose may be adopted as diagrammatically illustrated. The motor 95 is supplied with direct current through the commutators 97 and associated power lines.

Various constructions and expedients may be employed to connect this motor system to the elevators and ailerons of an airplane. This is illustrated diagrammatically in the plan view of an airplane in Fig. 9. The two ailerons 100 and 101 are shown as carried by shafts 102 and 103 suitably mounted in bearings and having a worm gear drive 104 for the shaft 102 and 105 for the other. The motor 106 is suitably connected to the gear system, as by a connecting gear on the motor shaft connecting with the driving gear of the worm drive 105. This motor corresponds with the motor 95 shown in Fig. 8, or is a synchronous servo-motor electrically connected to rotate through an equal angle with the motor 95, in accordance with standard methods. The two worm gear systems 104 and 105 are connected, such as illustrated, so that when the motor turns in a given direction, the aileron 100 will be elevated and the other aileron 101 will be depressed. Thus, by a reversing movement of the motor 106, these two ailerons may be controlled to govern the lateral tilting of the craft.

Elevators 108 and 109 may be connected through a shaft 110 mounted in suitable bearings and driven by a worm gear connection 111 with the reversing motor 112, which corresponds with motor 95 or is connected thereto by a servo-motor system. Thus, by this worm gear connection the elevator may either be raised or depressed to govern the pitch of the aircraft in the direction of its flight. Various electrical control systems may be employed, as will be understood by one skilled in the art.

It will also be appreciated that this same system may be employed to control and stabilize the position of a movable member relative to the horizon, such as the horizontal position of a table 115, as illustrated diagrammatically in Fig. 10. This table, which is intended to carry various instruments requiring a horizontal position for their operation, may be universely mounted by means of a ball 116 projecting downwardly from the center of the table and mounted in a suitable socket 117 carried on the foundation portion of the aircraft. Thus the table may rock in every direction about this universal pivot. The motors 118 and 119, suitably mounted on the craft, are respectively connected to diagonally opposite corners of the table by cables 120 and 121 which are suitably guided by pulleys 122 and are wound around capstans on the motor shafts. A suitable arrangement of the cables with their guiding pulleys 122 will serve to hold the table immovable except as the motors are individually turned. Thus the reversing motor 118 will tend to tilt the table about one diagonal line in one vertical plane, while the other motor 119 and its cable system will tilt the table in a plane at right angles thereto. This provides stabilization against any pitching and lateral tilting of the craft, whether a boat on water or a flight craft in the air, and the instrument table 115 will be held horizontal or in any desired position depending upon the arrangement of the cables and motor system. These motors 118 and 119 may involve servo-motor systems, or each may be a motor corresponding with motor 95 of the Fig. 8 control system. As above explained, the opposite scanning cathodes of Fig. 4 will control one motor 95, and the two remaining cathodes that scan at right angles to the first will control another duplicate motor system corresponding with that of Fig. 8. Hence the table will be rocked in accordance with the electronic scanning systems so that when the craft tilts to the left, for example, the table will be automatically tilted toward the right and thus be maintained in and indicate a horizontal position.

Primarily, the construction comprises a movable member whose attitude or position is governed during the craft movement, whether that member is the craft itself or an instrument or its mount on the craft. The movable member is controlled by electric motor mechanism which compensates for a vertical angular movement of the craft and thus tends to provide a stabilizing effect. This electrical mechanism is in turn governed by a photosensitive cell mounted for scanning a sector of a horizon within a limited vertical angle. Since the craft or instrument or its mount should be stabilized relative to the entire horizon circle, it is desirable to provide a set of cells, and preferably one in each quadrant or other sector angle, which has its activation or output varied according to the tilt of the craft in that sector. Each cell is so shielded by light shielding walls and partitions that its activation is dependent on the angular tilt of the cell relative to the horizon. That is, each cell is so shielded that its activation is varied in accordance with whether the major light received by the cell is derived from the sky or is reflected earth light. Thus, the horizon forms a boundary line which is indirectly caused to shadow the photo sensitive element to a varying extent. Consequently, that element, which may be balanced for a given horizon shadow effect, will have its electrical output varied in accordance with the cell activation.

It will, therefore, be appreciated that I may employ other photo cells and constructional features, such as those found in my prior Patents #2,489,218, 2,489,219, 2,489,220 and 2,489,223, and that the shield which governs the cell activation may comprise various types of boundary walls so located as to limit the activation of the photo sensitive element to a comparatively narrow angle of light. If a fixed photo tube, as shown in my patent #2,489,223, is arranged to scan an angular portion of the light either at or above or below the horizon, then a slight angular tilting of the craft and the photo tube carried thereby will cause the degree of activation to be increased or decreased depending upon whether the tube receives more or less sky light. Many modifications based on this theory of operation will be readily apparent to one who is skilled in the electronic art. Hence it is to be understood that the above description of a preferred construction comprising a shield on the tube wall associated with an inner sensitized cathode is to be interpreted broadly as the equivalent of such other electronic cell constructions. Also, although I prefer to scan the entire 360° horizon, it is feasible to scan only one half of it to effect full control of the stabilizing mechanism.

Various modifications will be readily apparent to one skilled in the art. It, for example, is entirely feasible to use separate motors instead of a single motor connected to the two ailerons of the aircraft, since each motor will be properly governed by its own opposed pair of photo cells. Many other mechanical and electrical mechanisms will be apparent as the equivalent of those herein described. Hence, the above description of preferred embodiments is to be interpreted as defining and illustrating the principles of my invention and not as imposing limitations on the appended claims.

I claim:

1. In a craft which is tiltable relative to the horizon, apparatus comprising a plurality of cells facing in different normally horizontal directions, each cell having a photosensitive element whose electrical output varies in accordance with its light activation, light shielding walls mounted on the craft which insure that the element will receive activating light only from limited horizontal and vertical sectors near the earth horizon when the craft is horizontal so that the activation of the element varies in a definite relationship only to a vertical angular movement of the cell relative to the substantially invariable plane defined by the earth and sky at the horizon when viewed from a high altitude, an electrical system governed by the cell and responsive to a variation in the activation of said element from a normal condition for a horizontal position to one which is related to the angle of tilting of the cell relative to the true horizontal plane of the horizon, a device having a part movably related to the tilting of the craft, and means governed solely by said cell and electrical system which moves said part in a definite relation to the tilting of the craft relative to the horizon as a reference.

2. In a craft which is tiltable relative to the horizon, apparatus comprising a plurality of cells arranged on the craft to face in different normally horizontal directions, each cell having a photosensitive element whose electrical output varies in accordance with its light activation, light shielding walls mounted on the craft which insure that each element will receive activating light only from limited horizontal and vertical sectors near the earth horizon when the craft is horizontal so that the activation of the element varies in a definite relationship only to a vertical angular movement of the cell relative to the substantially invariable plane defined by the earth and sky at the horizon when viewed from a high altitude, an electrical system including said cells which is responsive to a variation in the activation of said elements from a normal condition for a horizontal position to one which is related to the angle of tilting of the cells relative to the true horizontal plane of the horizon, an electric motor system governed solely by the system of said cells, a movable device, and means governed by the motor which moves said device in a definite relation to the tilting of the craft in any direction relative to the horizon as a reference.

3. Stabilizing apparatus in a craft comprising a movable control member, control apparatus therefor including a plurality of pairs of photosensitive elements facing normally in different horizontal directions, each pair being mounted on the craft to face in the same direction, the electrical output of each element varying in accordance with its light activation, means including light shielding walls which insure that one of the elements of each pair will receive activating light only within a limited horizontal and vertical sector above and below the invariable horizon plane as viewed from a high altitude so that its activation responds to a variation in the ratio of sky light to earth light with a tilting of the craft, the other element of the pair responding to ambient light, an electrical system for each pair of elements which is electrically balanced for a definite angular relationship of craft and horizon, and motor mechanism connected to move said control member which is governed by said systems so that the motor mechanism is caused to move the control member in opposite directions as determined by an unbalanced activation of one element relative to the other in the systems.

4. Apparatus according to claim 3 in which four pairs of elements are mounted to scan the horizon in the four quadrants and comprising two movable control members, each of the opposed pairs of elements being in separate balanced electrical systems, and separate motor mechanisms governed by the systems which actuate the two control members and provide stabilization relative to the horizon in all four quadrants.

5. Stabilizing apparatus for an aircraft having attitude controlling ailerons and elevator comprising two opposed sets of pairs of photosensitive cells arranged to scan the horizon in all quadrants of the horizon within a limited vertical angle, light shielding walls which insure that one cell of each pair will receive activating light only from a limited vertical angle within a quadrant at the horizon when the craft is horizontal, the other cell of the pair responding to ambient light, the cells of the opposed sets facing oppositely in opposed quadrants, each pair of cells in one set facing the same way, an electrical system for each pair of cells in which the cells are balanced, a reversible electric motor governing the ailerons, a second motor governing the elevator, each motor being controlled by a system of opposed cells and responding to a variation of light activation of the cells as caused by a tilting of the craft, and mechanisms actuated by the motors which operate the ailerons and elevator respectively as the craft tilts laterally or in the line of flight to urge the craft towards a horizontal position.

References Cited in the file of this patent

UNITED STATES PATENTS

| | | |
|---|---|---|
| 1,388,932 | Centervall | Aug. 30, 1921 |
| 1,794,690 | Horni | Mar. 3, 1931 |
| 2,421,192 | Engstrom | May 27, 1947 |
| 2,457,393 | Muffly | Dec. 28, 1948 |
| 2,489,222 | Herbold | Nov. 22, 1949 |
| 2,489,223 | Herbold | Nov. 22, 1949 |
| 2,604,601 | Menzel | July 22, 1952 |
| 2,630,283 | Hanson | Mar. 3, 1953 |

FOREIGN PATENTS

| | | |
|---|---|---|
| 352,035 | Great Britain | June 22, 1931 |